(No Model.)

D. H. TALBERT.
COFFEE OR TEA POT.

No. 597,483. Patented Jan. 18, 1898.

Witnesses
J. L. Cobb.
J. F. Riley

Inventor
Daniel H. Talbert.

By his Attorneys,
C. A. Snow & Co.

UNITED STATES PATENT OFFICE.

DANIEL H. TALBERT, OF KNIGHTSTOWN, INDIANA.

COFFEE OR TEA POT.

SPECIFICATION forming part of Letters Patent No. 597,483, dated January 18, 1898.

Application filed May 20, 1897. Serial No. 637,432. (No model.)

*To all whom it may concern:*

Be it known that I, DANIEL H. TALBERT, a citizen of the United States, residing at Knightstown, in the county of Henry and State of Indiana, have invented a new and useful Coffee or Tea Pot, of which the following is a specification.

This invention relates to improvements in coffee and tea pots.

The object of the present invention is to improve the construction of coffee and tea pots and to produce a circulation of outside or cold air through the pot and cause a condensation of the steam and vapor, thereby preventing the escape of the aroma and increasing the strength of the tea or coffee and facilitating a thorough extraction of the strength and aroma from such coffee or tea.

The invention consists in the construction and novel combination and arrangement of parts, as hereinafter fully described, illustrated in the accompanying drawings, and pointed out in the claims hereto appended.

Figure 1:
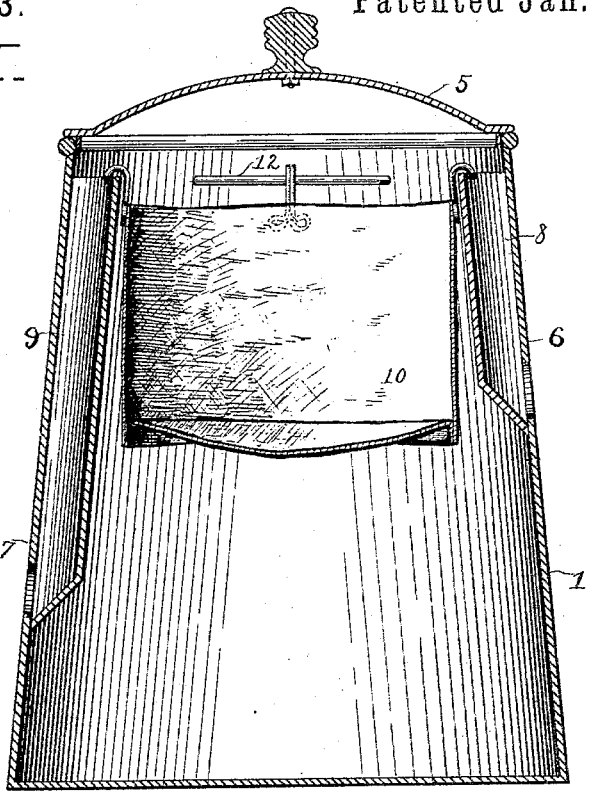
Figure 2:
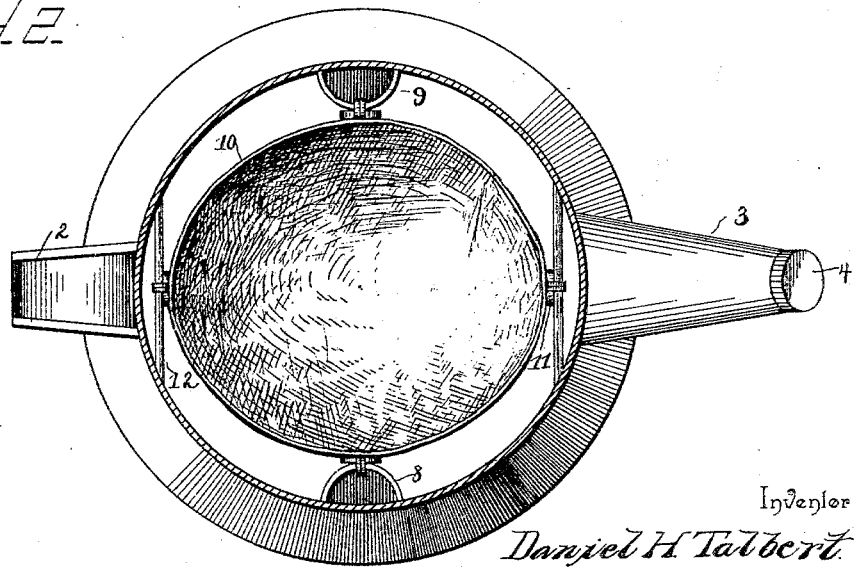

In the drawings, Figure 1 is a vertical sectional view of a coffee and tea pot constructed in accordance with this invention. Fig. 2 is a horizontal sectional view of the same, illustrating the manner of supporting the filter.

Like numerals of reference designate corresponding parts in both figures of the drawings.

1 designates a coffee or tea pot, provided with the usual handle 2 and having a spout 3, which is normally closed by a removable cap 4, and a cover 5 of the ordinary construction is provided. The body of the coffee or tea pot is provided at opposite sides with perforations or openings 6 and 7, located at different elevations and communicating with vertically-disposed interiorly-arranged tubes 8 and 9, forming air-passages and communicating at their upper ends with the interior of the coffee or tea pot. These air-tubes permit the entrance of cold air to the coffee or tea pot in order to condense the steam or vapor and prevent the aroma escaping and to cause such condensed vapor to percolate through the coffee or tea, which is contained within a filter 10. The tubes are preferably semicylindrical, as clearly shown in Fig. 2 of the accompanying drawings, and the openings 6 and 7 are arranged at different elevations in order to create a circulation of air within the coffee or tea pot.

The filter 10, which is in the form of a bag, is constructed of any suitable material and is provided at its upper edge with hooks 11, engaging over the upper edges of the tubes 8 and 9, and also engaging horizontal supporting-rods 12, located at points between the air-tubes and disposed diametrically opposite each other. The supporting-rods, which are straight, are soldered or otherwise secured at their ends to the inner face of the sides of the coffee or tea pot and are disposed in the same horizontal plane as the upper edges of the air-tubes.

The hooks serve to spread the mouth of the bag, which is offset sufficiently from the sides of the coffee or tea pot to provide an annular space for the passage of steam and vapor, and the condensed vapor entering the filter will percolate through the coffee or tea, and a constant circulation will thoroughly extract the strength and aroma and increase the flavor of the decoction or infusion.

It will be seen that the coffee and tea pot is simple and comparatively inexpensive in construction, that it is adapted to produce a circulation of cold air at the top of the filter, and that the aroma will be prevented from escaping and the strength and flavor of the coffee or tea be increased.

What I claim is—

1. The combination of a coffee or tea pot provided at opposite sides with openings located at different elevations, air-tubes arranged on the interior of the coffee or tea pot and communicating at their lower ends with the said openings and at their upper ends with the interior of the coffee or tea pot, and a filter arranged within the coffee or tea pot and provided with hooks engaging the upper edges of the air-tubes, substantially as described.

2. The combination of a coffee or tea pot provided at opposite sides with openings, interiorly-arranged air-tubes communicating with the openings, horizontal supporting-rods located at opposite sides of the pot and arranged between the tubes, and a filter provided with hooks engaging over the upper edges of the tubes and over the rods and offsetting the filter from the sides of the pot to provide an annular space, substantially as described.

In testimony that I claim the foregoing as my own I have hereto affixed my signature in the presence of two witnesses.

DANIEL H. TALBERT.

Witnesses:
JOHN E. KEYS,
CHAS. S. STUART.